(12) United States Patent
Stademann

(10) Patent No.: US 6,411,701 B1
(45) Date of Patent: Jun. 25, 2002

(54) METHOD AND SYSTEM OF DYNAMIC TRAFFIC CONTROL IN A COMMUNICATION NETWORK

(75) Inventor: Rainer Stademann, Egmating (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/308,752

(22) PCT Filed: Nov. 3, 1997

(86) PCT No.: PCT/DE97/02545

§ 371 (c)(1),
(2), (4) Date: May 24, 1999

(87) PCT Pub. No.: WO98/24247

PCT Pub. Date: Jun. 4, 1998

(30) Foreign Application Priority Data

Nov. 22, 1996 (DE) .......................................... 196 48 479

(51) Int. Cl.⁷ ............................................... H04M 7/00
(52) U.S. Cl. ............................. 379/221.03; 379/220.01
(58) Field of Search ........................... 379/112.01, 111, 379/138, 219, 220.01, 221.01, 221.03

(56) References Cited

U.S. PATENT DOCUMENTS 4,669,113 A 5/1987 Ash et al.
5,142,570 A 8/1992 Chaudhary et al.

FOREIGN PATENT DOCUMENTS

| EP | 0 229 494 | 7/1987 |
| EP | 0 376 556 | 7/1990 |
| EP | 0 449 480 A2 | 10/1991 |
| EP | 0 696 147 A1 | 2/1996 |
| WO | WO 93/08666 | 4/1993 |

OTHER PUBLICATIONS

Auf Alternativwegen zu mehr Gewinn, pp. 244–247, No Translation.

Dynamische nichthierarchische Verkehrslenkung, pp. 724–732, No Translation.

*Primary Examiner*—Creighton Smith
(74) *Attorney, Agent, or Firm*—Bell, Boyd & Lloyd LLC

(57) ABSTRACT

A method and routing system for the dynamic routing of traffic in a communication network wherein the dynamic alternate routing is adapted to the traffic load respectively present in the network in such a way that the network throughput is optimized. The alternate routing includes a dynamic path fan with alternative paths, during whose (re-) initialization the chronological sequence by which the alternative paths were removed from the path fan is taken into account.

2 Claims, 1 Drawing Sheet

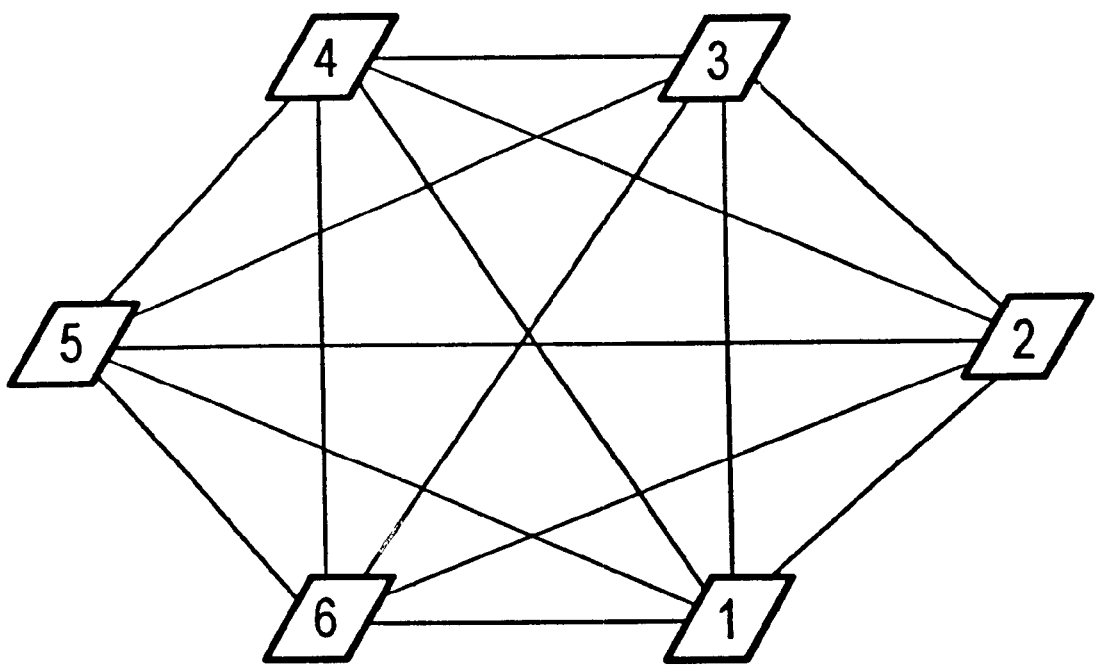

METHOD AND SYSTEM OF DYNAMIC TRAFFIC CONTROL IN A COMMUNICATION NETWORK

BACKGROUND OF THE INVENTION

1. Field of the Invention

The present invention relates to a method and routing system for the dynamic routing of traffic in a communication network wherein the dynamic alternate routing. is adapted to the traffic load present in the network such that network throughput is optimized.

2. Description of the Prior Art

In a fully meshed non-hierarchical network with n network nodes, for each origin-destination pair, there exists n-2 alternative paths having only 2 path segments. Of these alternative paths, of which there are a network-wide total of n×(n-1)×(n-2), and given an unevenly loaded network, some paths are underloaded and some paths are overloaded.

Non-hierarchically organized line-switching communication networks require a dynamic alternate routing that is adapted to the traffic load respectively present in the network in such a way that the network throughput is optimized. In particular, uneven load situations must be relieved by the alternate routing.

As in conventional alternate routing in hierarchical networks, with a dynamic alternate routing the attempt is first made to set up connections via one or more planned paths, which are, for the most part, direct paths. If this is not possible, because, for example all connection line bundles of the direct path are completely occupied, alternative paths are assigned to the overflow traffic.

In the selection of the alternative paths, the difference in principle is between dynamic and conventional alternate routing. In conventional alternate routing, administratively defined alternative paths are searched in a fixed sequence for an unoccupied line or, respectively, an unoccupied channel ("fixed alternate routing"). This pursuant to this method, the alternate routing reacts substantially insufficiently to unplanned, unusual load situations.

In dynamic alternate routing, occurrent overflow traffic is assigned to one or more active alternative,paths. This active alternate path or paths are not fixed. Rather they are selected according to the respective method for dynamic alternate routing or are newly determined for each call. The advantages of dynamic alternate routing are its robustness and flexibility in relation to uneven load situations in the network which can arise for example due to chronologically fluctuating loads (spatially limited rigid traffic incidence, e.g. in catastrophes) and network degradation (connection line bundle failures, failures of switching units). In addition, uncertainties in the network planning can be better compensated.

Central state-controlled (dynamic) routing methods are supported by a network-central processor that receives information about the present local load situation from the network nodes. Advantageous, underloaded paths can be determined centrally in this way, and the network nodes can be notified accordingly. Among other things, disadvantages include the large expense for network central stations, data transmission and the additional computing capacity required in the network nodes.

Decentral state-controlled (dynamic) methods (see e.g. EP 0 449 480 A3, EP 0 376 556 A3) are based on the reporting back of load states of the trunk groups to the origin node of the non-hierarchical (sub-)network. These methods have the disadvantage in that the non-standardized interface between the network nodes requires a homogenous network (e.g., network node of only one manufacturer) and, moreover, a high signaling expense is required.

Decentral event-controlled (dynamic) routing methods (see, e.g., EP0 339 494 B1) can achieve an increase in performance in that they learn the respective load situation by evaluating the congestion events. These methods use the congestion information (blocking event information) in order to replace the blocked path with another path. However, no distinction is thereby made between sporadic blockings (caused by static fluctuations of the offered traffic) and almost completed blocking (caused by uneven loading or partial network overload). A further decentral event-controlled method is known from European application EP 0 696 147 A1 (SAG-internal 94P1542E).

In a high-load situation, it can occur that the path fan becomes smaller very rapidly, wherein a reinitialization occurs very quickly. Since, in this case, the path fan is refilled again with alternative paths that were previously removed, it can occur that alternative paths previously removed very recently again can be incorporated into the path fan. Since the probability is high that the load of these alternative paths has hardly changed in this short time period the path fan will again become small very rapidly, and a new reinitialization accurs soon. This process greatly reduces the performance of the method, in particular given high loading.

SUMMARY OF THE INVENTION

By means of the present invention, therefore highly-loaded alternative paths are prevented from being offered again for overload traffic too soon after their removal from the path fan and, thus, from again receiving traffic even though alternative paths already removed for a longer time would again offer sufficient capacity.

Accordingly, in an embodiment of the present invention, a method is provided for dynamic traffic routing in a communication network, wherein the method includes the steps of: initially offering calls between an origin switching node and a destination switching node to one or more preferred paths (planned paths); offering calls to alternative paths contained in a path fan, according to a particular selection scheme, for the case in which none of the planned paths is available; removing an alternative path previously contained in the path fan from the path fan as soon as, upon offering of a call, it is determined that it is no longer available; registering the chronological sequence by which the alternative paths are removed from the path fan; and reinitializing the path fan after the introduction of a particular event and/or fulfillment of a particular condition, by refilling it with previously removed alternative paths, wherein the path fan is refilled with the alternative paths that, according to the chronological sequence, have already been removed from the path fan for the longest time.

In an embodiment, the method further includes the steps of: offering overflow calls, up to a predetermined maximum number, to an alternative path selected from the path fan for the overflow traffic, before a transition is made to the alternative path that is next according to the named selection scheme; counting the number of calls offered to the alternative path up to a possible determination of non-availability; incorporating, given a determination of non-availability of the alternative path, this path into a first passive set of alternative paths if the named number is less than a particular value; incorporating this path into a second passive set of alternative paths if the named number reaches or exceeds the particular value; and reinitializing the path fan such that alternative paths that come from the first passive set and have already been removed from the path fan for the longest time are again incorporated into the path fan, and, if these do not suffice to refill the path fan, alternative paths that come from the second passive set and have already been removed from the path fan for the longest time are also incorporated into the path fan.

Additional features and advantages of the present invention are described in, and will be apparent from, the Detailed Description of the Preferred Embodiments and the Drawing.

DESCRIPTION OF THE DRAWING

FIG. 1 shows a diagram of a small fully meshed network with six network switching nodes. Also shown are and the corresponding capacities of the path, segment (left) between the network nodes wherein a link includes at least one connection line bundle.

DETAILED DESCRIPTION OF THE PREFERRED EMBODIMENTS

Let it be assumed that the switching node 1 has a call for switching node 2, but the direct route between the two switching nodes is not available.

Let it further be assumed that the path fan, i.e. the fan of the active alternative paths, includes after its last reinitialization three alternative paths; namely, the two-link alternative paths via the switching nodes 3, 4 and 5.

In addition, let it be further assumed be that the overflow traffic is cyclically distributed to these active alternative paths in uniform fashion by the routing system, in the sequence: transit nodes 3, 4 and 5.

Under these assumptions, the routing system first checks the switching node 1 to see whether the first link of the active alternative path via transit node 3 is available, i.e., whether the link between switching nodes 1 and 3 includes free lines or, respectively, channels that can be occupied (in the following, only "channels" will be referred to).

In order to be able to check this, the routing system stores, in the switching node 1, the maximum capacity of the link between switching nodes 1 and 3, namely 125 channels, and the associated trunk reservation parameter for this link; let this be, for example, 10. In addition, the routing system stores the number of channels currently being used. From the point of view of the routing system, the link between switching nodes 1 and 3 is thus available for overflow traffic when the sum of the channels in use and the trunk reservation parameter is less than 125 (the trunk reservation guarantees the stability of a routing method in the high-load region).

If the first link is available, the switching node 1 first sets up the connection up to the switching node 3. Before the continuation of the connection setup to the destination switching node 2, the routing system of the switching node 3 then checks the availability of the second link. This is done by checking whether the sum of occupied channels plus trunk reservation parameter is less than the capacity of the second link. For this purpose, the routing system of the switching node 3 knows the maximum capacity of the link between switching nodes 3 and 2, the trunk reservation parameter of this link, and the number of currently occupied channels of this link.

If the second link of the cited active alternative oath is also available, the connection from the transit node 3 to the destination node 2 is set up.

In the cited case of successful switching of the call via transit node 3, upon the next call for switching node 2, given non-availability of the direct route, an attempt is made to direct the overflow call via transit node 3. The number of calls immediately following one another that are successfully offered to the alternative path is counted. Cyclic changing first takes place upon reaching a predeterminable maximum number of successfully offered calls; i.e., the next-following overflow call is then routed via the next active alternative path, or with the active alternative path via transit node 4. in this way, short-term autocorrelations in the traffic offering at the second link can be used which increase the probability that a further connection on the same path can be set up immediately after a successful connection setup.

If, before or after reaching the named maximum number, the non-availability of an alternative path is determined (transit node 3 determines, for example, that the link to the destination node 2 is not available, and clears down the connection segment to the origin node 1 with a specially identified acknowledgment message (crankback message)), the alternative path is removed from the path fan accordingly the chronological sequence by which the alternative path is removed from the path fan is registered.

The removed alternative path is incorporated into a first set (called a first passive set) of alternative paths if the number of calls successfully offered to the alternative path is less than a particular value, and is incorporated into a second (passive) set of alternative paths if the number reaches or exceeds the particular value. The chronological sequence according to which the alternative paths are removed from the path fan is registered. Upon a reinitialization, the path fan is refilled with the alternative paths that, according to the chronological sequence, have already been removed from the path fan for the longest time.

After the introduction of a particular event (e.g., command from network management or expiration of a time period) and/or of a particular condition (e.g., fewer than a predetermined number of alternative paths in the path fan), the path fan is reinitialized. The reinitialization takes place in that the path fan is refilled with those alternative paths that, according to the chronological sequence, have already been removed from the path fan for the longest time. At first, only alternative paths [sic] from the first passive set are thereby taken into account. However, if this is not sufficient to refill the path fan, alternative paths from the second passive set are also taken into account.

If the transit node 3 determines that the link to the destination node 2 (second link) is not available, transit node 3 clears down the connection segment to the origin node 1 with a specially identified acknowledgment message (crankback message).

The routing system of the origin node 1 thereupon removes the alternative path via transit node 3 from the path fan for destination node 2. The alternative paths removed from the path fan due to non-availability on the second link are [sic] in turn, handled as explained above.

Although the present invention has been described with reference to specific embodiments, those of skill in the art will recognize that changes may be made thereto without departing from the spirit and scope of the invention as set forth in the hereafter appended claims.

I claim:

1. A method for dynamic traffic routing in a communication network, the method comprising the steps of:

offering, initially, calls between an origin switching node and a destination switching node to at least one preferred path;

offering calls to alternative paths contained in a path fan according to a selection scheme if none of the preferred paths is available;

removing an alternative path previously contained in the path fan from the path fan as soon as, upon offering of a call, it is determined that it is no longer available;

registering a chronological sequence by which the alternative paths are removed from the path fan; and reinitializing the path fan after at least one of an introduction of a particular event and a fulfillment of a particular condition by refilling the path fan with previously removed alternative paths, wherein the path fan is refilled with the alternative paths that, according to the chronological sequence, have already been removed from the path fan for a longest period of time.

2. A method for dynamic traffic routing in a communication network as claimed in claim 1, further comprising the steps of:

offering overflow calls, up to a predetermined maximum number, to an alternative path selected from the path fan for overflow traffic before a transition is made to the alternative path that is next according to the selection scheme;

counting the number of calls offered to the alternative path up to a possible determination of non-availability;

incorporating the alternative path, given a determination of non-availability of the alternative path, into a first passive set of alternative paths if the number is less than a particular value;

incorporating the alternative path into a second passive set of alternative paths if the number at least reaches the particular value; and reinitializing the path fan, wherein alternative paths in the first passive set which have already been removed from the path fan for the longest period of time are incorporated into the path fan, and wherein, if the alternative paths from the first passive set which are again incorporated into the path fan do not suffice to refill the path fan, alternative paths in the second passive set which have already been removed from the path fan for the longest period of time are also incorporated into the path fan.

\* \* \* \* \*